United States Patent
Field

(10) Patent No.: US 8,349,183 B2
(45) Date of Patent: Jan. 8, 2013

(54) WATER CONDITIONER ASSEMBLY

(76) Inventor: George Raymond Field, Edmonton (CA)

( * ) Notice: Subject to any disclaimer, the term of this patent is extended or adjusted under 35 U.S.C. 154(b) by 291 days.

(21) Appl. No.: 12/801,524

(22) Filed: Jun. 14, 2010

(65) Prior Publication Data
US 2011/0303603 A1 Dec. 15, 2011

(51) Int. Cl.
*B01D 24/40* (2006.01)
(52) U.S. Cl. ........ 210/285; 210/288; 210/289; 210/291; 210/456
(58) Field of Classification Search ............ 210/283, 210/285, 286, 289, 290, 291, 347, 486, 288, 210/456
See application file for complete search history.

(56) References Cited

U.S. PATENT DOCUMENTS

| | | | | |
|---|---|---|---|---|
| 402,224 A * | 4/1889 | Blessing | | 210/264 |
| 1,568,796 A * | 1/1926 | Breer | | 210/130 |
| 3,174,623 A * | 3/1965 | Sloan | | 210/285 |
| 3,554,377 A * | 1/1971 | Miller | | 210/275 |
| 6,059,967 A * | 5/2000 | Field | | 210/247 |

* cited by examiner

*Primary Examiner* — Matthew Savage
(74) *Attorney, Agent, or Firm* — George A. Seaby

(57) ABSTRACT

A distributor for use on a dip tube in the particulate bed of a water conditioner includes a sleeve mounted on the dip tube, a plurality of resilient vanes extending radially outwardly from the sleeve, thin membranes on the vanes, and holes in the membranes, whereby water flowing through the bed is evenly distributed throughout the bed and the bed is agitated by up and down flexing of the distributor in the bed.

7 Claims, 5 Drawing Sheets

WATER CONDITIONER ASSEMBLY

BACKGROUND OF THE INVENTION

Field of the Invention

This invention relates to a water conditioner assembly, and to a distributor for use in such an assembly.

Water conditioners for domestic use include a tank containing a particulate material for softening water by removing calcium and magnesium salts. They are also used to remove a large number of organic and inorganic substances including iron and/or sulfur from the water. The typical apparatus has four cycles of operation including a service cycle, a backwash cycle, a regeneration cycle and a rinse cycle.

During the service cycle, water is filtered through the bed of particulate material for use. The backwash cycle is used to remove contaminants from the bed. The bed is often regenerated during a regeneration cycle, and the bed is stabilized and flushed during the rinse cycle.

During the service cycle, water flows in one direction (downwardly) through the bed and is discharged upwardly through a dip tube or the like. During backwashing, the flow of water is reversed, i.e. the water flows down the dip tube and upwardly through the bed to "lift" the bed, i.e. to place the bed in suspension and cause agitation for dislodging bed contaminants, which are drained from the top of the tank. Backwashing also serves to prevent compacting of the bed. During regeneration, fresh chemicals are introduced into the tank to recharge the particulate material. In the case of a water softener, the active ingredient introduced into the particulate material bed is sodium or potassium chloride. When iron or sulfur is to be filtered, potassium permanganate is used to regenerate the bed.

A problem with water conditioner apparatuses of the type described above is incomplete use of the bed of particulate material during each cycle of operation. During the service and regeneration cycles, liquid flowing through the tank seldom contacts more than 30 to 70% of the particulate material. Moreover, during backwashing, when the bed is placed in suspension, filtered material is often not evenly removed from the tank due to channeling in the opposite direction which results in uneven depletion or exhaustion of bed capacity and a reduction of bed efficiency.

With conventional dip tube type water conditioners, it has been found that chemicals added during the regeneration or salting cycle tend to hug the dip tube thus contacting a relatively small proportion of the bed.

Apparatuses addressing the problem of efficient bed use are described in U.S. Pat. Nos. 3,395,099 and 3,455,458 issued to R. D. Johnson on Jul. 30, 1968, and Jul. 15, 1969, respectively; and the present inventor's U.S. Pat. Nos. 5,472, 609 and 6,059,967 issued Dec. 5, 1995 and May 9, 2000, respectively. Devices for distributing fluid in particulate bed filter apparatuses are described in U.S. Pat. No. 3,240,699, issued to J. H. Duff et al on Mar. 15, 1996; U.S. Pat. No. 3,402,126, issued to Y. R. Cioffi on Sep. 17, 1968; U.S. Pat. No. 3,429,443, issued to H. B. Stern on Feb. 25, 1969; U.S. Pat. No. 3,451,554, issued to C. E. Wade on Jun. 24, 1969; U.S. Pat. No. 3,747,768, issued to S. E. Barrera on Jul. 14, 1973; and U.S. Pat. No. 3,809,247, issued to J. E. Brett on May 7, 1974.

While the patents listed above provide at least a partial solution to the problem of efficient bed use, there is still substantial room for improvement.

In spite of recent advances in the field, water channeling through resin or particulate filtration systems is still a significant problem. As mentioned above, the path of least resistance in most systems is to bypass the body of the conditioning bed and channel down the center of the bed around the dip tube. Two significant reductions in efficiency result from this, namely decreased active bed content and bleeding, or premature breakthrough. Because much of the bed is bypassed by the source water, effective contaminant removal is severely reduced below theoretical capacity. The center of the bed then becomes prematurely saturated, and contaminants begin leaking through prior to pre-determined backwash and regeneration times.

GENERAL DESCRIPTION OF THE INVENTION

The present invention provides an assembly incorporating relatively simple distribution devices which are positioned at various locations in a water conditioner tank to control the direction of flow of the water which ensures even distribution of bed material and liquid during the service, regeneration, backwashing and rinse cycles described above.

Accordingly, the invention provides a water conditioner assembly comprising a tank for carrying a bed of particulate material; an opening in the top end of the tank; a manifold mounted on the tank over the opening; a first inlet in said manifold for introducing water from a source thereof into the manifold; a dip tube connected to said manifold and extending downwardly to a location proximate the bottom of the tank for carrying water to and from the manifold; said dip tube having an open bottom end permitting the flow of water into and out of the bottom of the dip tube; an outlet in said manifold for discharging water from said tank during a service cycle of the assembly; a second inlet in said manifold for introducing chemicals into said tank during a particulate bed regeneration cycle where necessary; and a plurality of distributors on said dip tube including a first distributor on the dip tube on top of the bed of particulate material or proximate the top of the bed; and at least one other distributor located in the bed of particulate material above the bottom end of the dip tube, each said distributor including a sleeve secured to the dip tube; a plurality of top and bottom vanes spaced equidistant apart around said sleeve and the tip tube, each vane having a vertical arm connected to the top or bottom end of said sleeve and a horizontal arm extending radially outwardly from a coil at an outer end of the vertical arm, whereby the horizontal arm can move upwardly or downwardly relative to a rest position, thin circular top and bottom membranes attached to the horizontal arms of the top and bottom vanes, and a plurality of holes in said membranes permitting the flow of liquid therethrough, to direct the flow of the water, ensuring even distribution of water flowing upwardly or downwardly through the particulate bed material.

The assembly of the present invention operates to overcome the issues described above by redirecting source water from a channeled state to one of controlled flow. This device directs the water in the correct direction during upflow and downflow through the bed. The assembly redirects most of the water away from the center of the bed and into the unused periphery. The built-in lateral flexibility of the assembly combined with strategically placed internal channels accomplishes the redirection without compromising service flow rates or limiting bed expansion during backwash and regeneration. The result is greater bed utilization which increases the operational efficiency of the filtration system, and a concomitant decrease in bed channeling permitting longer operational runs.

Channeling effects through the bed greatly decrease effective media bed contact rates due to incomplete bed usage and premature saturation. The assembly described herein elevates such rates closer to theoretical maximums, significantly increasing contact times between contaminants and medias. This has a profoundly beneficial effect on all filtration processes, including gravity filtration (sand, anthracite), ion exchange (softening systems), adsorption (activated carbon), and oxidative catalysis (greensand and other media).

BRIEF DESCRIPTION OF THE DRAWINGS

The invention is described below in greater detail with reference to the accompanying drawings, wherein.

DESCRIPTION OF THE PRIOR ART

Figure 1:
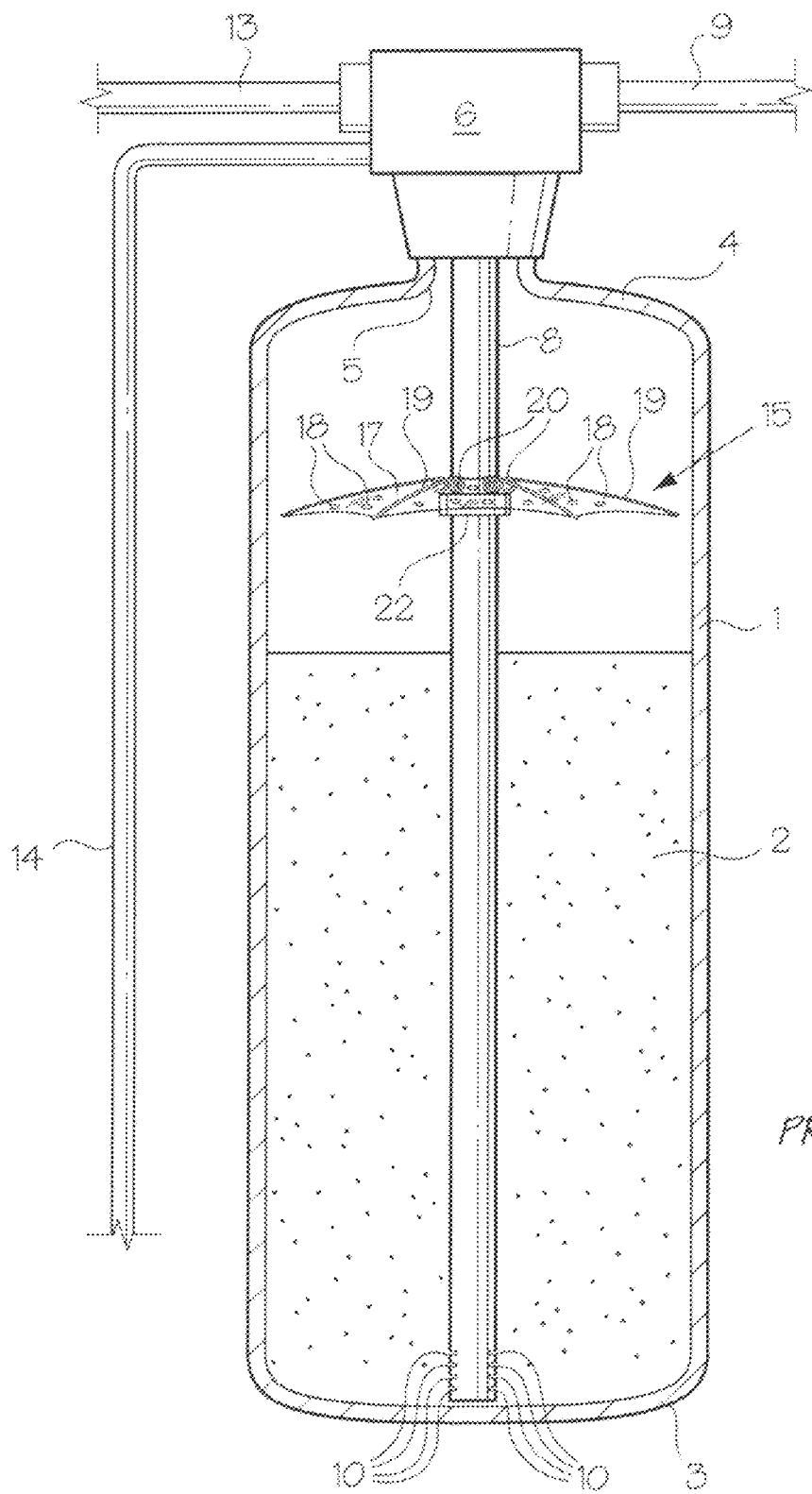
FIG. 1 is a schematic, longitudinal sectional view of a prior art water conditioner containing a distributor.

With reference to FIG. 1, a distributor for a water conditioner of the type described in the inventor's Canadian Patent Application Serial No. 2,532,896, filed Jan. 12, 2006, includes a tank 1 containing a bed 2 of particulate material for conditioning water. The tank 1 has a closed bottom end 3 and a top end 4 with a central opening 5 which is closed by a control and valve assembly 6. A dip tube 8 extends downwardly from the assembly 6 into the center of the tank 1. During the service cycle of operation, water enters the tank 1 via an inlet pipe 9, the assembly 6 and the opening 5. The water percolates downwardly through the bed 2 and enters the dip tube 8 through slits 10 at the otherwise closed bottom end of the dip tube 8. The thus conditioned water flows upwardly and is discharged for use via the assembly 6 and an outlet pipe 13.

During periodic backwash cycles to clean the bed 2 of contaminants, water enters the tank 1 though the dip tube 8 and is discharged into the bed 2 via the slits 10 in the bottom end of the tube 8. The water places the bed in suspension and causes agitation to dislodge bed contaminants, which are drained from the top of the tank via the assembly 6 and drainpipe 14. During regeneration cycles, chemicals from a source thereof (not shown) are fed into the tank 1 via a second inlet pipe 14', the assembly 6 and the opening 5.

As mentioned above, liquid flowing through the tank 1 seldom contacts any more than 30-70% of the particulate material forming the bed 2. The use of slits 10 at the bottom end of the dip tube 8 does not ensure that much of the bed 2 is contacted by liquid during the backwash cycle. The same is true during the service or regeneration cycles when material enters the tank 1 through the opening 5.

A top distributor indicated generally at 15 helps to solve the problem of liquid/bed contact during the service, regeneration and backwash cycles. The top distributor 15 ensures even distribution of liquid above the bed during the services and regeneration cycles. The top distributor 15 includes an umbrella-shaped body 17 formed of a thin plastic or other sheet material, e.g. polyethylene which includes a plurality of spaced apart holes 18. The body 17 is maintained in the open position shown in the drawings by a plurality of radially extending spokes 19. The spokes 19 are resilient. For such purpose, spring coils 20 are provided at the inner ends of the spokes 19. A ring 22 on the dip tube 8 holds the spokes 19 and consequently the distributor 15 in position.

Material entering the tank 1 through the opening 5 encounters the top of the distributor body 17 and flows downwardly towards the periphery of the tank 1. Some of the material flows around the outer periphery of the body 17 to the outside of the bed 2. The remaining material flowing down the body 17 flows through the holes 18 to the various areas of the bed 2. In order to ensure even distribution of the water or other material to the top of the bed 2, the holes 18 are arranged in concentric circles with the holes in one circle being staggered with respect to the holes in an adjacent circle. The circle closest to the dip tube 8 includes one hole 18 between each adjacent pair of spokes 19. Succeeding circles moving outwardly form the tube 8 contain two, then one and finally two holes 18 between each adjacent pair of spokes 19. Moreover, the holes 18 in alternate circles are radially aligned.

It has been found that the use of the distributor 15 above the bed 2 of particulate material does not work very well, Liquid entering the top of the tank 1 passes around and through the distributor 15 and then passes through the bed 2 more or less hugging the dip tube 8. Moreover, in the backwash and upflow brine cycle fluid is directed inwardly defeating the purpose of the distributor 15.

DESCRIPTION OF PREFERRED EMBODIMENT

Figure 2:
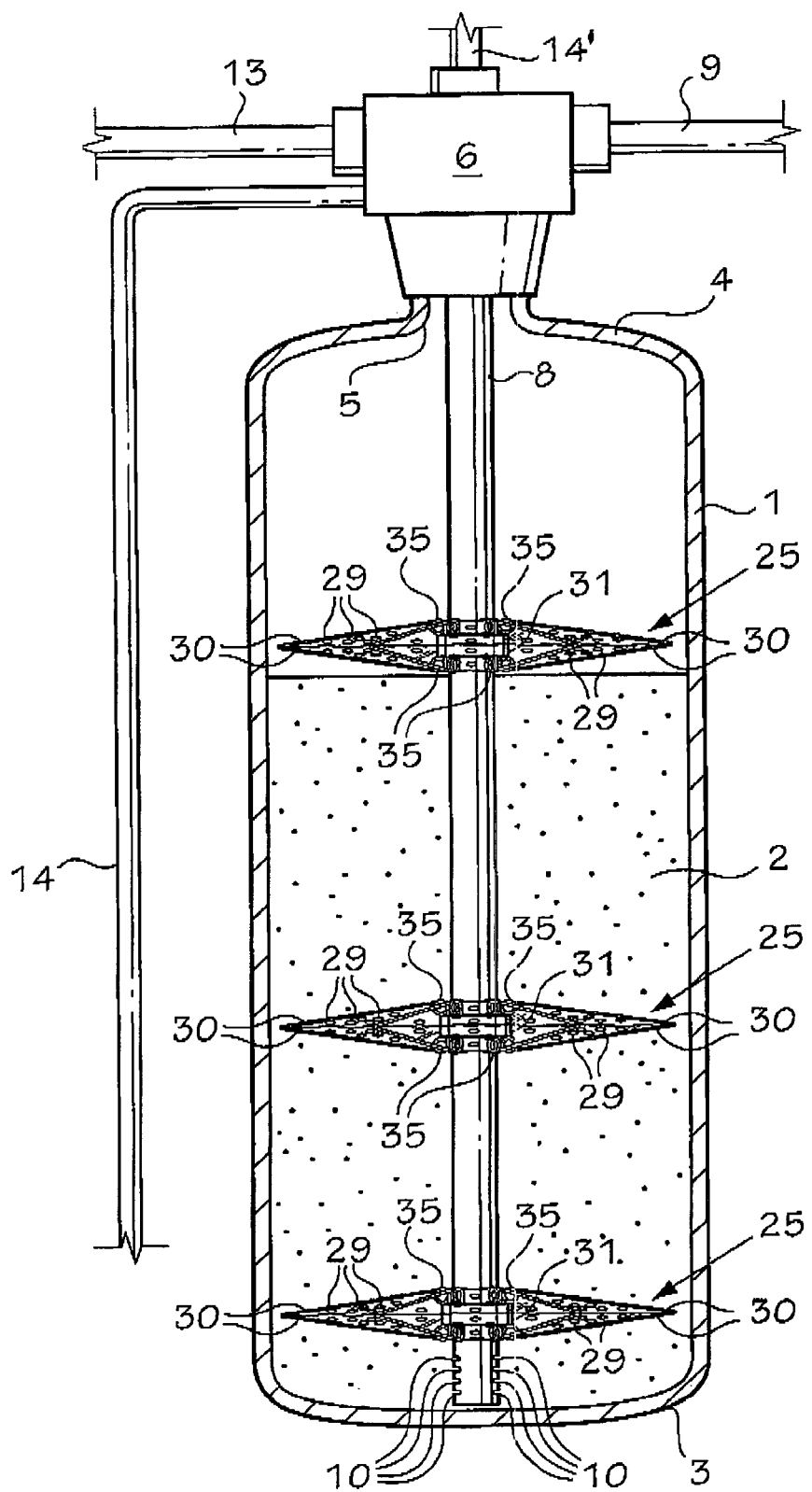
FIG. 2 is a schematic, longitudinal sectional view of a water conditioner assembly containing distributors in accordance with the present invention.

In accordance with the present invention, the single distributor 15 above the bed as described above is replaced by two or more distributors indicated generally at 25. It is worth noting that while FIG. 2 shows three distributors, in certain circumstances, depending upon bed size, only two distributors are required, one being on the top of the bed, and the other being in the bed immediately above the slits 10. In fact, there is no restriction as to the number of distributors in the bed.

Figure 3:
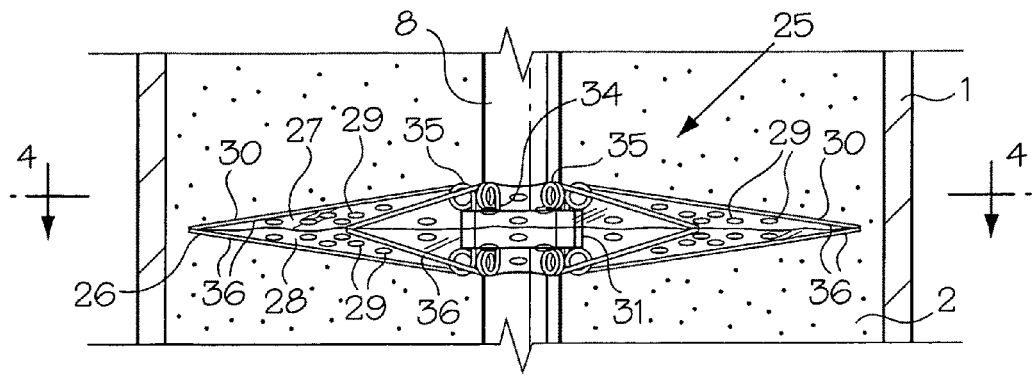
FIG. 3 is a side view of a section of the water conditioner of FIG. 2 showing the distributor on a larger scale.
Figure 4:
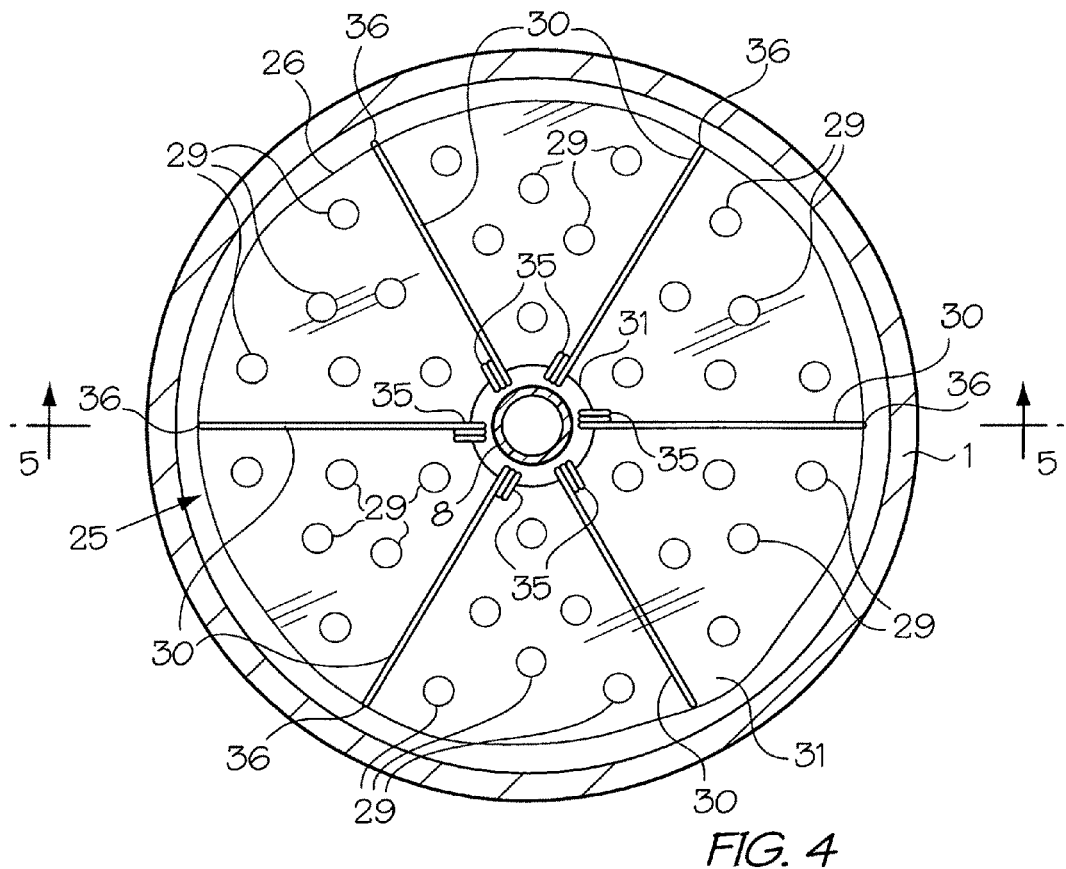
FIG. 4 is a top view of the distributor of FIG. 3.
Figure 5:
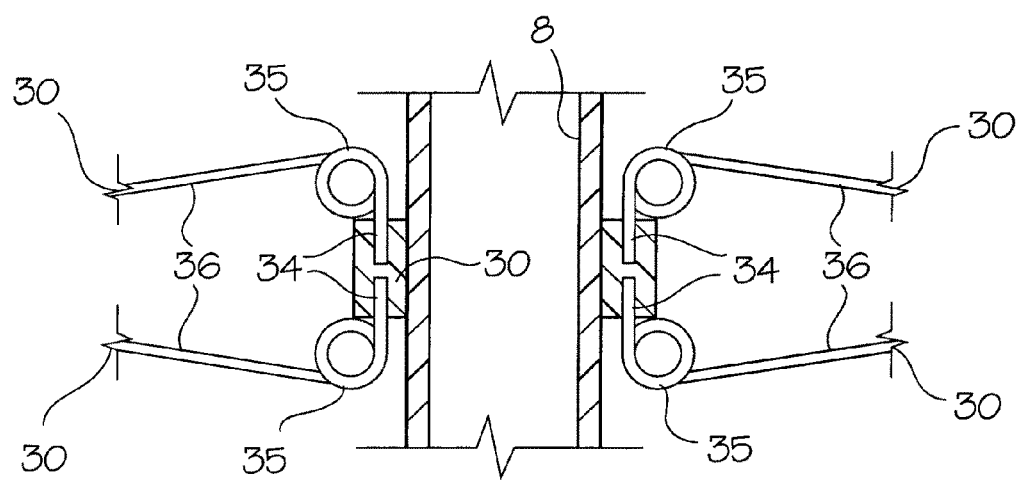
FIG. 5 is a cross-section taken generally along line 5-5 of FIG. 4 showing the central portion of the distributor.
Figure 6:
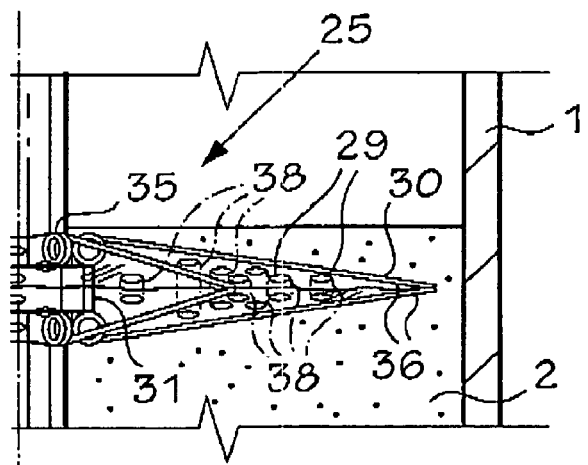
FIG. 6 is a side view of a section of the water conditioner assembly of FIG. 2 showing one-half of a second embodiment of the distributor.
Figure 7:
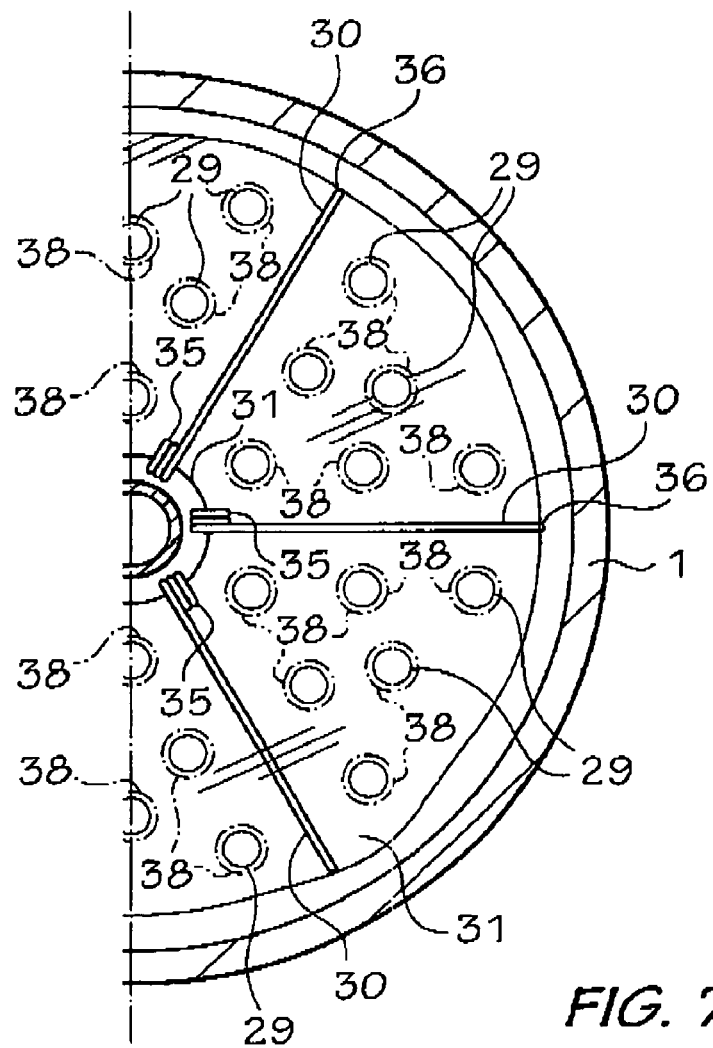
FIG. 7 is a top view of the section of the water conditioner of FIG. 6.

As best shown in FIGS. 3 and 4, each of the distributors 25 is defined by a roughly disc-shaped body 26. Whereas the distributor described in CA 2,532,896 is designed to flex in one direction only, the distributor of the present invention is capable of flexing in both vertical directions. In order to achieve this effect, the disc-shaped body 26 is formed of top and bottom sheets 27 and 28, respectively. The sheets 27 and 28 are sealed together at their outer peripheries. A plurality of spokes 30 connect the sheets 27 and 28 to a ring 31 mounted on the dip tube 8. Each of the spokes 30 includes a vertical arm 34 (FIGS. 3 and 5) embedded in the ring 31, coils 35, and generally horizontal arms 36 extending radially outwardly to the outer periphery of the body. The coils 35 permit flexing of the arms 36 in either vertical direction. The outer ends of the arms 36 are not connected to each other and therefore are independent of each other for upward and downward movement In accordance with another embodiment of the invention, thin flexible tubes 38 (shown in phantom outline in FIG. 6 and in solid lines in FIG. 7) extend between the vertically aligned holes 29 in the top and bottom sheets 27 and 28 for carrying liquid though the distributor body.

The distributor structure described above serves to ensure uniform distribution of liquid flowing through the bed in either direction, i.e. during downward perculation in the service and regeneration cycles, and during upward flow in the backwash cycle. Flexing of the distributor in both directions to an umbrella or inverted umbrella-like configuration promotes the flow of liquid around the periphery of the distributor, while liquid is being dispersed via the holes 29.

When the bed of particulate material 2 is layered, e.g. when the bed is defined by two or more layers, e.g. a bottom layer of resin and a top layer of carbon, a distributor can be provided at the junction between layers to separate the layers and stabilize the bed.

The invention claimed is:

1. A distributor for use on a dip tube in a bed of particulate material in a water conditioner assembly comprising a sleeve for mounting on the dip tube; a plurality of resilient top and bottom spokes spaced apart around said sleeve, each spoke having a vertical arm extending into the top or bottom end of the sleeve; a helical spring on an outer end of the vertical arm and a horizontal arm extending radially outwardly from the helical spring whereby the horizontal arm can move upwardly and downwardly relative to a rest position; thin top and bottom membranes attached to the horizontal arms of the top and bottom spokes; and a plurality of holes in said membranes permitting the flow of water therethrough.

2. The distributor of claim 1 wherein the holes in the top and bottom membranes are vertically aligned.

3. The distributor of claim 2 including flexible tubes extending between the aligned holes in the top and bottom membranes for carrying water through the distributor.

4. A water conditioner assembly comprising a tank; a bed of particulate material in said tank; an opening in the top end of the tank; a manifold mounted on the tank over the opening; a first inlet in said manifold for introducing water from a source thereof into the manifold; a dip tube connected to said manifold and extending downwardly to a location proximate the bottom of the tank for carrying water to and from the manifold; said dip tube having an open bottom end permitting the flow of water into and out of the bottom of the dip tube; an outlet in said manifold for discharging water from said tank during a service cycle of the assembly; a second inlet in said manifold for introducing chemicals into said tank during a particulate bed regeneration cycle where necessary; and a plurality of distributors on said dip tube including a first distributor on the dip tube on the top of the bed of particulate material or proximate the top of the bed; and at least one other distributor located in the bed of particulate material above the bottom end of the dip tube, each said distributor including a sleeve secured to the dip tube; a plurality of top and bottom spokes spaced equidistant apart around said sleeve and the dip tube, each spoke having a vertical arm connected to the top or bottom end of said sleeve and a horizontal arm extending radially outwardly from a coil at an outer end of the vertical arm, whereby the horizontal arm can move upwardly or downwardly relative to a rest position, thin circular top and bottom membranes attached to the horizontal arms of the top and bottom spokes, and a plurality of holes in said membranes permitting the flow of liquid therethrough, to direct the flow of the water, ensuring even distribution of water flowing upwardly or downwardly through the particulate bed material.

5. The water conditioner assembly of claim 4, wherein each spoke of the distributor includes a vertical arm extending into a top or bottom end of said sleeve, a helical spring on an outer end of the vertical arm and a horizontal arm extending radially outwardly from the helical spring.

6. The water conditioner of claim 5, wherein the holes in the top membrane are vertically aligned with the holes in the bottom membrane.

7. The water conditioner assembly of claim 6, including flexible tubes extending between aligned holes in the top and bottom membranes for carrying water though the distributor.

* * * * *